United States Patent [19]

Alio

[11] Patent Number: 4,509,345

[45] Date of Patent: Apr. 9, 1985

[54] LAUNDRY HEAT RECOVERY SYSTEM

[76] Inventor: Peter Alio, Box 212-B, Tillson, N.Y. 12486

[21] Appl. No.: 429,627

[22] Filed: Sep. 30, 1982

[51] Int. Cl.³ .................. D06F 31/00; D06F 39/04
[52] U.S. Cl. ........................................ 68/20; 68/27; 165/40
[58] Field of Search .............. 68/16, 20, 27; 34/86, 34/48; 165/39, 40, DIG. 12; 126/427, 437, 422

[56] References Cited

U.S. PATENT DOCUMENTS

| | | | |
|---|---|---|---|
| 3,050,867 | 8/1962 | Friedman | 34/86 |
| 3,186,107 | 6/1965 | Raley | 34/48 X |
| 3,771,238 | 11/1973 | Vaughn | 68/27 X |
| 4,151,730 | 5/1979 | Wendel | 68/27 X |
| 4,153,955 | 5/1979 | Hinterberger | 126/422 X |
| 4,184,481 | 1/1980 | Tornquist | 126/422 |
| 4,275,510 | 6/1981 | George | 68/20 X |
| 4,299,199 | 11/1981 | Girone | 126/427 X |

Primary Examiner—Philip R. Coe
Attorney, Agent, or Firm—Joseph J. Connerton

[57] ABSTRACT

A laundry heat recovery system includes a heat exchanger associated with each dryer in the system, the heat exchanger being positioned within the exhaust system of the dryer. A controller responsive to the water temperature of the heat exchangers and the water storage for the washer selectively circulates the water through a closed loop system whereby the water within the exchangers is preheated by the associated dryers. By venting the exhaust air through the heat exchanger, the air is dehumidified to permit recirculation of the heated air into the dryer.

10 Claims, 4 Drawing Figures

LAUNDRY HEAT RECOVERY SYSTEM

FIELD OF THE INVENTION

The present invention relates to a laundry heat recovery system and more particularly to improved apparatus for utilizing the hot air discharge from dryers to preheat washwater and to dehumidify the discharge air to allow recirculation of the dehumidified air into the drier.

DESCRIPTION OF THE PRIOR ART

The use of exhaust heat from a dryer to preheat water in a commercial laundry is known in the art, and is shown, for example, in U.S. Pat. No. 4,275,510 to George. The term "commercial laundry", as herein utilized, refers to an installation of coin operated washing meachines and dryers, and not to a commercial laundry facility. In typical commercial laundry installations, particularly those heated by oil, enormous fuel costs for heating water for washing machines and air for dryers have contributed to increased user cost and decreased operator profits. This cost factor is particularly acute in the northeastern area of the United States during winter. While it is also known in the art to transfer dryer exhaust heat back into the dryer, this has a relatively limited effect since the exhaust heat contains a high moisture content or humidity.

SUMMARY OF THE INVENTION

In accordance with the present invention, there is provided a laundry heat recovery system in which each dryer has an associated heat exchanger for preheating water using the heat exhaust from the dryer. The heat exchanger conprises a section of high pressure thin walled copper pipe wound in a cylindrical configuration, which is designed to fit within the exhaust duct of the dryer. Cold water enters the top, circulates, is heated by the dryer exhaust and the preheated water then pumped to a storage tank which provides the hot water for the washer operation. Since the temperature of the water circulating in the copper tubing is below that of the dryer exhaust, the device functions as a dehumidifier to capture the internal condensate of the vented hot air and transport it out of the ducting system whereby the dehumidified hot air can be used as "makeup air" for the associated dryer. The system can be fully automatic or manually controlled in accordance with the laundry installation with which it is associated.

Accordingly, a primary object of the present invention is to provide an improved heat exchange system for use in commercial laundry systems.

Another object of the present invention is to provide an improved heat exchanger adapted to utilize the exhaust from a laundry dryer to preheat water for the washing cycle.

Still another object of the present invention is to provide a heat exchanger system adapted to fit within the ducting system of a commercial dryer and to dehumidify air passing therethrough for recirculation through the dryer.

DESCRIPTION OF A PREFERRED EMBODIMENT

Figure 1:
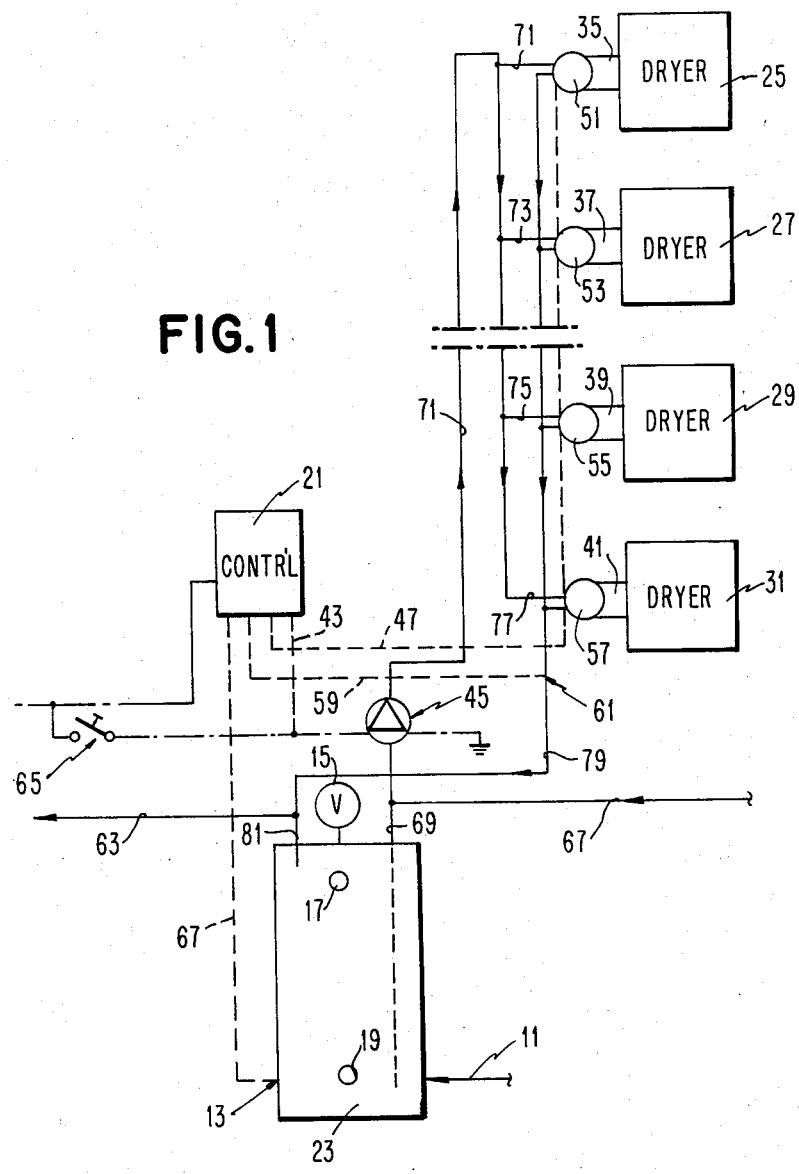
FIG. 1 is a system schematic of a commercial laundry system utilizing the present invention.

Referring now to the drawings and more particularly to FIG. 1 thereof, there is illustrated a schematic diagram of a commercial laundry system incorporating the present invention. As previously noted, the term "commercial laundry" designates a laundry having coin operated washing and drying machines, rather than a commercial garment washing facility. Such installations comprise a plurality of washing and drying machines, a typical average size installation having 20 washers and 10 dryers. Typical hot water temperatures used for washing are on the order of 130°–135° F., while the average exhaust temperature from the dryers may range between 160°–180° F.

Referring back to FIG. 1, a storage tank 11 has an associated temperature sensor 13 and a pressure relief valve 15. The temperature sensors associated with the present invention are conventional, and accordingly have been omitted from the drawings in the interest of clarity. Storage tank 11 in the illustrated embodiment is associated with a boiler, not shown, designed to heat and store the hot water used by the washing machines. The storage tank includes a cold water inlet 17 and a hot water outlet 19. A plurality of dryers 25, 27, 29, 31, shown by way of example, have individual heat exchangers 35, 37, 39 and 41 respectively mounted in the exhaust vent of their associated dryer.

Figure 2:
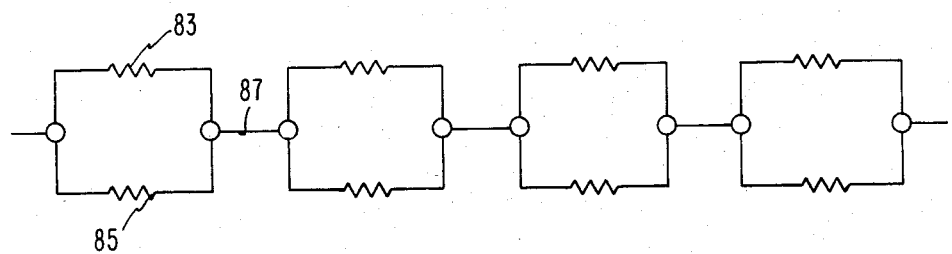
FIG. 2 is a circuit schematic of the unit sensor configuration utilized in the present invention.

The electrical and water flow control system of the instant invention is controlled by differential controller 21. As illustrated, controller 21 is connected via line 43 to circulator 45, which controls the water flow through the system as hereinafter described. Controller line 47 is connected to themostatic sensors 51, 53, 55, 57 associated with heat exchangers 35, 37, 39, and 41 respectively. The sensors are commercially available thermostatic sensors known in the art as RTDs (resistance temperature devices). In turn, the sensors 51, 53, 55, 57 are interconnected to provide and respond to an average of the temperatures of the associated heat exchangers. It is apparent that at any given time none, some, or all of the associated dryers might be operating, so that the water temperature in the heat exchangers would vary. The sensors are connected as shown in FIG. 2 to provide the average temperature. While an average temperature is provided by the sensors and water circulated through all exchangers to provide a low cost installation, individual sensors could be connected to direct the water flow only through the exchanger associated with an operating dryer. The controller is connected to a freeze sensor, not shown, which causes the water to be circulated via line 63 to the boiler, while a manual override switch 65 is provided in the event of controller failure or to modify the above described operation. Finally, the controller is connected via line 67 to storage sensor 13. The controller responds to the various temperature indicators from the sensors to control the water circulation through the system as described below.

When the controller senses a 10° temperature difference between the tank sensor 13 and the unit sensors 51, 53, 55, 57, i.e., the unit sensors have a higher temperature, although the specific temperature difference is a matter of design choice, the circulator 45 is turned on, and circulates water from the cold water inlet 67 or the tank 11 via pipe 69, through line 71 and the inlet line of each of heat exchangers 35, 37, 39, 41 via water lines 71, 73, 75, 77 respectively. After circulation through the heat exchangers, the water passes through the outlet lines of the heat exchangers, the outlets being shown directly below inlet lines 71, 73, 75, 77 and returned via line 79 to the inlet 81 of tank 11. The circulation continues until the temperature difference is only 3°, again a design choice temperature, at which time the circulation is terminated. It should be noted, as previously described, that the storage tank 11 is connected to the furnace or boiler where the dryer activity does not call for circulation through the heat exchangers as above described, i.e., where the temperature drops below 130° F.

Referring now to FIG. 2, the wiring configuration for the unit sensors is illustrated. An individual sensor for each energy exchange device is utilized in the present invention. The sensors, as previously indicated, are commercially available resistor temperature devices. While the sensor devices in FIG. 2 correspond to sensors 51, 53, 55, 57 in FIG. 1, they are labeled separately for clarity of description. The configuration in FIG. 2 shows four unit sensor blocks, each block comprising two thermo-resistor units connected in parallel. Thus, parallel connected resistors 83, 85 constitute a thermo sensor unit which is interconnected to the remaining sensors. The controller requires 10,000 ohms load for the sensor configuration. Thus, each platinum resistance temperature device, such as thermo-resistor 83, 85, would require 5,000 ohms, or a net of 2,500 ohms for each unit sensor block. The serially connected four sensor blocks provide a total load of 10,000 ohms. The blocks are interconnected with stranded wire, which provides improved operation compared to individual conductors with a controller.

As previously described, the unit sensors are physically mounted on the water inlet pipes. The specific details of the controller and sensors have been omitted as unnecessary to an understanding of the present invention since they are commercially available, and the operation of temperature comparison to effect an electrical operation is also known in the art. It is the operation of the controller and sensors to control the water circulation as a function of two water temperatures which is significant.

Figure 3:
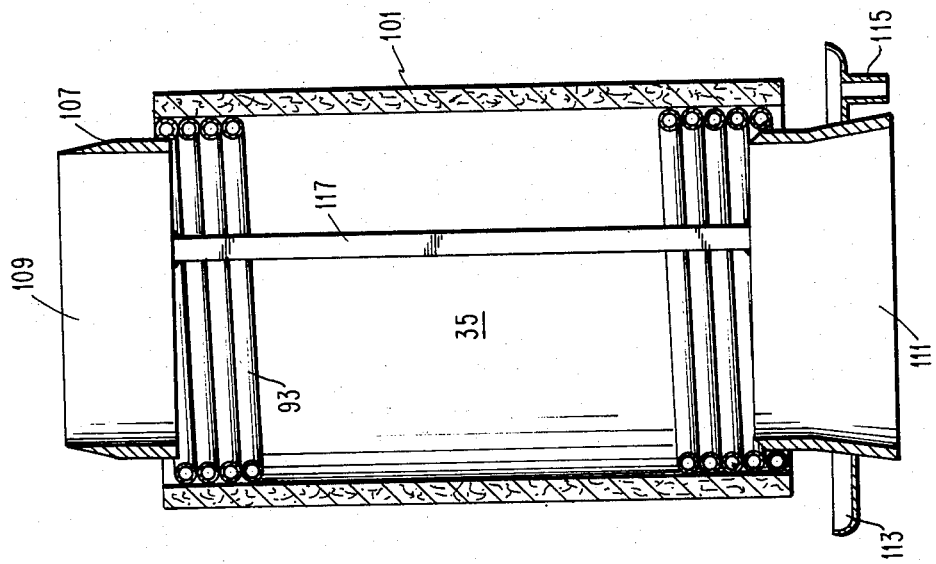
FIG. 3 is a detailed view of the heat exchanger apparatus utilized in the present invention.

Referring now to FIG. 3, there is illustrated a side view of the heat exchanger and dehumidifier shown as cylinders 35, 37, 39 and 41 in FIG. 1. The device is broken away in part to illustrate the inner construction thereof. The exchanger of the preferred comprises a cylinder which is designed to fit the 8" conventional ductwork in the dryer exhaust and approximately 2' high. However, where larger dryers are employed, either a larger energy changer could be used, or the exhaust venting reduced to match the diameter of the heat exchanger. The cylinder is mounted in an upright position, as more fully shown in FIG. 4 as compared to the horizontal position of the standard dryer exhaust. The cylinder comprises an outer layer 101 of close cell EDPM ™, a foam insulation to eliminate heat radiation and to provide support for the copper tubing. Approximately 100' of ¼" high pressure copper tubing is wound within the 2'8" cylinder. While not visible in FIG. 3, cold water is entered through port 103 and removed from port 105 (FIG. 4) which would be connected to opposite ends of the tubing. Upper and lower stacks 109 and 111 are used to connect the exchanger to the conventional dryer exhaust. A catch basin 113 and associated drain 115 are used to collect the moisture obtained through dehumidifying as described below. One or more support brackets 117 are used to maintain the coils in their prescribed position.

Figure 4:
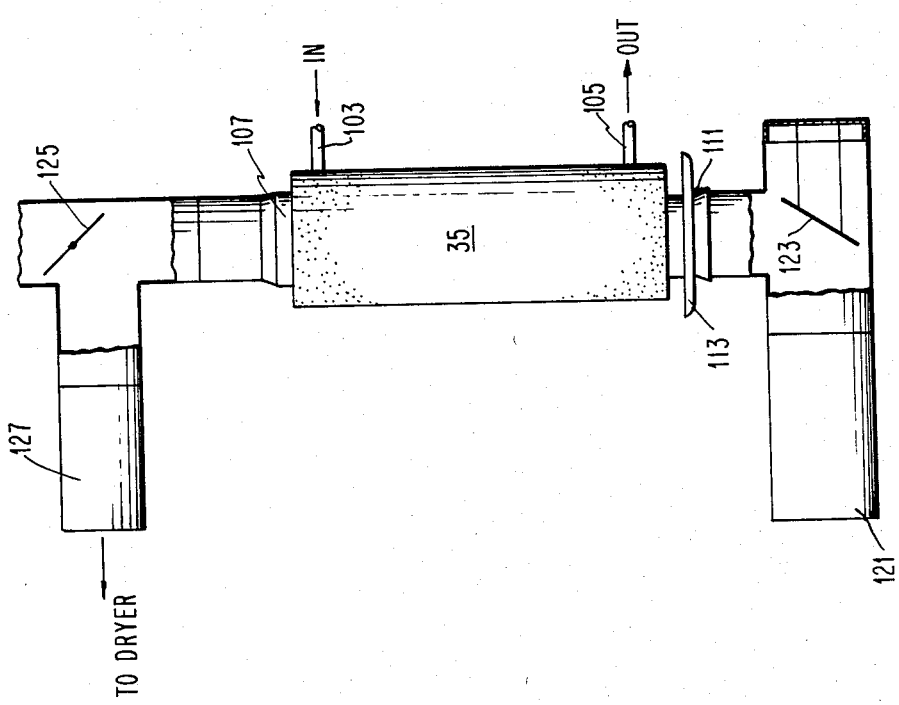
FIG. 4 is a schematic view of the heat exchanger mounted in the exhaust outlet of a laundry dryer.

The operation of the invention will be described with reference to FIG. 4, wherein elements corresponding to FIG. 3 are so labeled. Assume that associated laundry dryer 25 (FIG. 1) is operating, and the hot air vented through vent pipe 121. The hot air baffle or damper 123 directs the hot air (160°–180°) flow into heat exchanger 35. Since the water in coil 93 is always less than the temperature of the dryer exhaust in vent 121, and may be as cold as room temperature, as the heated air flows through the coils, condensation around the tubing takes place and drops to catch basin 113. Conventionally, commercial dryers exhaust between 400–800 cu. ft. of air per minute at a temperature of 160°–180° F. Normally, the "makeup" air in the dryer is air brought from the outside and heated. Using the instant invention, the humidity is reduced to 15, so that all or a substantial part of the exhaust air can be redirected to the dryer through damper 125 and exhaust tube 127 as makeup air to assist in the drying cycle, thereby further increasing the efficiency of the system.

In summary, the instant invention provides a system adapted to fit within an existing commercial laundry installation which provides substantial energy cost saving both in dryers and washers. In typical installations, energy cost saving of up to 40 percent for dryers and up to 30 percent for washers can be provided. Special installations using larger size dryers such as hotels, motels, etc., can provide even greater cost saving. The invention utilizes high pressure copper pipe, no moving parts, no corrosion, nothing to wear out, maintenance free, fast payback and quick simple installation.

While the invention has been shown and described relative to a preferred embodiment thereof, it will be understood by those skilled in the art that various changes in form or detail may be made therein without departing from the spirit and scope of the instant invention.

Having thus described my invention, what I claim as new and desire to secure by Letters Patent is:

1. A laundry heat recovery system comprising in combination,
   a laundry installation comprising a wash water source and a plurality of laundry washers and dryers,
   a plurality of heat exchangers,
   each of said heat exchangers being mounted in the exhaust outlet of an associated dryer,
   each of said heat exchangers being adapted to heat the water contained therein with exhaust heat from its associated dryer,
   a heat sensor associated with each of said heat exchangers for determining the temperature of the water therein,
   a heat sensor associated with said wash water source, and
   means responsive to a predetermined relationship between said heat exchanger sensors and said wash water source sensor for selectively circulating the water through said heat exchangers to said wash water source, thereby raising the temperature of said wash water source.

2. A system of the type claimed in claim 1 wherein said heat exchangers comprise a plurality of coils located within the exhaust outlet of said associated dryers.

3. A system of the type claimed in claim 2 wherein the exhaust heat from said dryer is dehumidified by the lower temperature of said heat exchanger coils to provide additional hot air for recirculation within said associated dryer.

4. A system of the type claimed in claim 1 wherein said heat exchanger sensors are interconnected in a configuration to provide an average temperature indication for the water in said plurality of heat exchangers.

5. A system of the type claimed in claim 4 wherein said water circulation is controlled as a function of the average heat exchanger temperature and the temperature of said wash water source.

6. A system of the type claimed in claim 4 wherein said means for selectively circulating water through said heat exchangers includes a controller responsive to a comparison between said average heat exchange sensors and said wash water sensor.

7. A system of the type claimed in claim 6 wherein said controller circulates water through a closed loop system terminating at said wash water source when the average temperature of said heat exchangers exceeds the temperature of said wash water source by a predetermined incremental temperature.

8. A device of the type claimed in claim 6 wherein said controller is a differential temperature controller.

9. A device of the type claimed in claim 4 wherein said heat exchanger sensors comprise thermostatic sensors comprising thermo-resistor units controlled by said controller.

10. A system of the type claimed in claim 9 wherein said heat exchanger sensors are individually selectable in accordance with their individual temperatures.

* * * * *